UNITED STATES PATENT OFFICE.

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PROCESS OF TREATING ALUNITE.

1,401,741. Specification of Letters Patent. Patented Dec. 27, 1921.

No Drawing. Application filed February 26, 1920. Serial No. 361,466.

*To all whom it may concern:*

Be it known that I, MARK SHOELD, a subject of the King of Sweden, residing at Chicago, in the county of Cook and State of Illinois, have invented certain new and useful Improvements in Processes of Treating Alunite, of which the following is a specification.

My invention relates to the treatment of alunite containing potassium sulfate and aluminum sulfate or potassium aluminum sulfate preliminary to the production of potash alum and aluminum sulfate therefrom.

The leading object and prime purpose of the invention are the provision of a process or method of treatment which is simple, inexpensive to practice, and which is effective and efficient in the preparation of the alunite for further suitable chemical or other treatment.

The process comprises grinding the alunite, mixing it with a small percentage of carbonaceous material, heating such mixture in a reducing atmosphere at such temperature and for such a period of time as will partially decompose the aluminum sulfate, but without causing decomposition of the potassium sulfate, and then cooling the material out of contact with air therewith.

A desirable appliance for carrying on the process comprises a revoluble inclined cast-iron drum without lining, heated externally to a dull red heat by the combustion of fuel on a suitable grate, the drum or cylinder extending through the combustion chamber, such chamber being connected to a stack or chimney as is customary. The lower end of such heating cylinder communicates directly with and delivers its heated material into a water-jacketed revoluble cooling drum, the contents of which are reduced in temperature without coming into contact with the outside air. The product may be discharged from the lower end of such cooling drum in any approved and well-known manner.

The process is practised in substantially the following manner:

A finely-divided mixture of approximately 95 to 97 parts by weight of ground alunite and 3 to 5 parts of carbon, softcoal, or other appropriate and suitable carbonaceous material, is continuously introduced by a screw-conveyer or other convenient means into the upper end of the revolving, inclined, unlined, castiron drum, heated externally to a temperature of from 500 to 600 degrees Centigrade, 550 degrees having been found to be a good or fair average. By the time the material has traversed such drum in the usual way, a portion only of the aluminum sulfate will have been decomposed, the sulfur trioxid and some moisture being driven off, the alumina being partly converted into aluminum hydrate or / and basic sulfate with some hydrate water. There is, however, no decomposition or volatilization of the potassium sulfate. By calcination the alunite may lose approximately 25% of its weight. As the material leaves the hot drum or cylinder, it is discharged or delivered into the revolving water-jacketed cooling-drum to the inside of which the outside air does not have access, and from this it is delivered in cooled condition, ready for further chemical or other treatment.

The entire products of such process, as outlined above, including the potassium sulfate, alumina, or aluminum hydrate, and aluminum sulfate, may all be dissolved in sulfuric acid giving a solution of potassium sulfate and aluminum sulfate. Then this solution may be boiled down and the potassium aluminum sulfate crystallized out, and a mother liquor will be aluminum sulfate, which when concentrated, forms a thick paste and may be run out and cooled in pans.

It will be readily understood that the external firing of the calcining drum and the carbon of the mixture assure the required reducing atmosphere, the carbon also facilitating the decomposition and expulsion of the sulfur components of the aluminum sulfate. If the deoxidizing conditions were not employed, the alumina produced would be much less soluble, in fact, practically insoluble, so that the presence of the carbon really determines to a large extent the degree of solubility of the produced alumina. Seemingly, the sulfur oxid of the sulfate is driven off more readily when it is reduced to a lower oxid, or to elemental sulfur, hydrogen sulfid or sulfids, the freed oxygen combining with the carbon, the latter, of course, in some measure being consumed.

If alunite is calcined without the reducing atmosphere, the temperature required to form the alumina and potassium sulfate, causes the former to become very inactive or practically-insoluble for ordinary purposes because of the freed oxygen present, the alumina being comparatively insoluble in sulfuric acid. The effect of the reducing atmosphere is that the sulfuric acid bound to the alumina may be driven off at a considerably lower temperature than if no deoxidizing condition were employed, and in this way the alumina becomes quite soluble as stated. The higher the temperature to which the alumina is heated in an oxidizing atmosphere, the more insoluble it becomes, whereas, the reducing atmosphere renders it comparatively readily soluble.

Two conditions, therefore, are required in the present process: first, the reducing or deoxidizing atmosphere, and, second, a temperature insufficient to decompose the potassium sulfate, but adequate to effect decomposition of the aluminum sulfate in part. If either one of these conditions is absent, the best results will not be had.

Various minor changes may be made in the process or method presented and in the type of apparatus employed, without departure from the heart of the invention and without the sacrifice of any of its substantial benefits and advantages. For example, the percentages of ingredients employed and the temperature used are subject to some variations, and, additionally, I do not wish to be bound to the chemical theories herein advanced, but no difficulty will be experienced in practising the process from the full description presented above. In some cases satisfactory results may be had by cooling the drum by air instead of water.

I claim:

1. The process of treating alunite consisting in heating a mixture of alunite and carbonaceous material in a reducing atmosphere at a temperature and for a period of time sufficient to decompose its aluminum sulfate in part only but without decomposing or volatilizing its potassium sulfate, substantially as described.

2. The process of treating alunite consisting in heating a mixture of alunite and carbonaceous material in a reducing atmosphere at a temperature and for a period of time sufficient to decompose its aluminum sulfate in part only but without decomposing or volatilizing its potassium sulfate, and cooling the product out of contact with the external air, substantially as described.

3. The process of treating alunite consisting in heating a finely divided mixture consisting of approximately 95 to 97 percent. of ground alunite and about 3 to 5 percent. of carbonaceous material in a reducing atmosphere at a temperature of approximately 550 degrees C. without decomposing or volatilizing the potassium sulfate of the alunite but effecting the decomposition of its aluminum sulfate in part, substantially as described.

4. The process of treating alunite consisting in heating a finely divided mixture consisting of approximately 95 to 97 per cent. of ground alunite and about 3 to 5 per cent. of carbonaceous material in a reducing atmosphere at a temperature of approximately 550 degrees Centigrade without decomposing or volatilizing the potassium sulfate of the alunite but effecting the decomposition of its aluminum sulfate in part and cooling the treated material without contact of the air therewith, substantially as described.

MARK SHOELD.